United States Patent
Wang et al.

(10) Patent No.: US 12,021,981 B2
(45) Date of Patent: Jun. 25, 2024

(54) METHOD AND SYSTEM TO PERFORM ENCRYPTION AND DECRYPTION OPERATIONS DURING REKEY IN VIRTUALIZED COMPUTING ENVIRONMENT

(71) Applicant: VMware, Inc., Palo Alto, CA (US)

(72) Inventors: Wenguang Wang, Santa Clara, CA (US); Abhay Kuamr Jain, Cupertino, CA (US); Ruiling Dou, Shanghai (CN); Tao Xie, Shanghai (CN); Xin Li, Fremont, CA (US); Chandrakanth Gadhiraju, Fremont, CA (US); Kevin Rayfeng Li, San Francisco, CA (US); Satish Pudi, Saratoga, CA (US)

(73) Assignee: VMware, Inc., Palo Alto, CA (US)

(*) Notice: Subject to any disclaimer, the term of this patent is extended or adjusted under 35 U.S.C. 154(b) by 297 days.

(21) Appl. No.: 17/684,432

(22) Filed: Mar. 2, 2022

(65) Prior Publication Data

US 2023/0224155 A1 Jul. 13, 2023

(51) Int. Cl.
*H04L 9/08* (2006.01)
*G06F 21/60* (2013.01)

(52) U.S. Cl.
CPC .......... *H04L 9/0891* (2013.01); *G06F 21/602* (2013.01)

(58) Field of Classification Search
CPC ... H04L 9/0891; H04L 9/0822; H04L 9/0894; H04L 9/08; G06F 21/602
See application file for complete search history.

(56) References Cited

U.S. PATENT DOCUMENTS

| | | | |
|---|---|---|---|
| 2016/0156462 A1* | 6/2016 | Winslow | H04L 9/0891 380/279 |
| 2022/0006618 A1* | 1/2022 | Powers | G06F 21/602 |

* cited by examiner

*Primary Examiner* — Quazi Farooqui
(74) *Attorney, Agent, or Firm* — King Intellectual Asset Management

(57) ABSTRACT

An example method for a first host, being an owner of an object stored in a virtual storage area network (vSAN) cluster, to perform encryption and decryption operations during a rekey in the vSAN cluster is disclosed. The method includes obtaining a first encryption key and a first key identifier (ID) of the first encryption key; transmitting the first key ID and an active key index to a second host; using the first encryption key to perform encryption and decryption operations; and in response to a determination of receiving a key change notification from a master node of the vSAN cluster, terminating a connection with the second host.

21 Claims, 4 Drawing Sheets

METHOD AND SYSTEM TO PERFORM ENCRYPTION AND DECRYPTION OPERATIONS DURING REKEY IN VIRTUALIZED COMPUTING ENVIRONMENT

CROSS-REFERENCE TO RELATED APPLICATION

The present application claims the benefit of Patent Cooperation Treaty (PCT) Application No. PCT/CN2022/070725, filed Jan. 7, 2022, which is incorporated herein by reference.

BACKGROUND

Unless otherwise indicated herein, the approaches described in this section are not admitted to be prior art by inclusion in this section.

A virtualization software suite (e.g., vSphere Suite) for implementing and managing virtual infrastructures in a virtualized computing environment may include a hypervisor (e.g., ESXi) that implements virtual machines (VMs) on physical hosts, a virtual storage area network (vSAN) software that aggregates local storage to form a shared datastore for a cluster of physical hosts, and a server management software (e.g., vCenter) that centrally provisions and manages virtual datacenters, VMs, hosts, clusters, datastores, and virtual networks.

The vSAN software uses the concept of a disk group as a container for solid-state drives (SSDs) and non-SSDs, such as hard disk drives (HDDs). On each host (node) in a vSAN cluster, the local drives of the host are organized into one or more disk groups. Each disk group includes one SSD that serves as read cache and write buffer (e.g., a cache tier), and one or more SSDs or non-SSDs that serve as permanent storage (e.g., a capacity tier). The aggregate of the disk groups from all the nodes form a vSAN datastore distributed and shared across the nodes of the vSAN cluster.

The vSAN software stores and manages data in the form of data containers called objects. An object is a logical volume that has its data and metadata distributed across a vSAN cluster. For example, every virtual machine disk (VMDK) is an object, as is every snapshot. For namespace objects, the vSAN software leverages virtual machine file system (VMFS) as the file system to store files within the namespace objects. A virtual machine (VM) is provisioned on a vSAN datastore as a VM home namespace object, which stores metadata files of the VM including descriptor files for the VM's VMDKs.

The data stored and managed by the vSAN software may be encrypted. The encryption disallows accesses to the stored data without appropriate keys to unlock the data. "Rekey" refers to a process of changing one or more keys used in encryption and decryption operations and is widely used to increase the security level of such operations. However, rekey is time consuming. The old key and the new key coexist during the rekey, which causes adoption issues to encrypt and decrypt data in the virtualized computing environment. For example, in some conventional approaches, the old key may be used to decrypt data that are encrypted by the new key, resulting in decryption failures.

DETAILED DESCRIPTION

Figure 1:
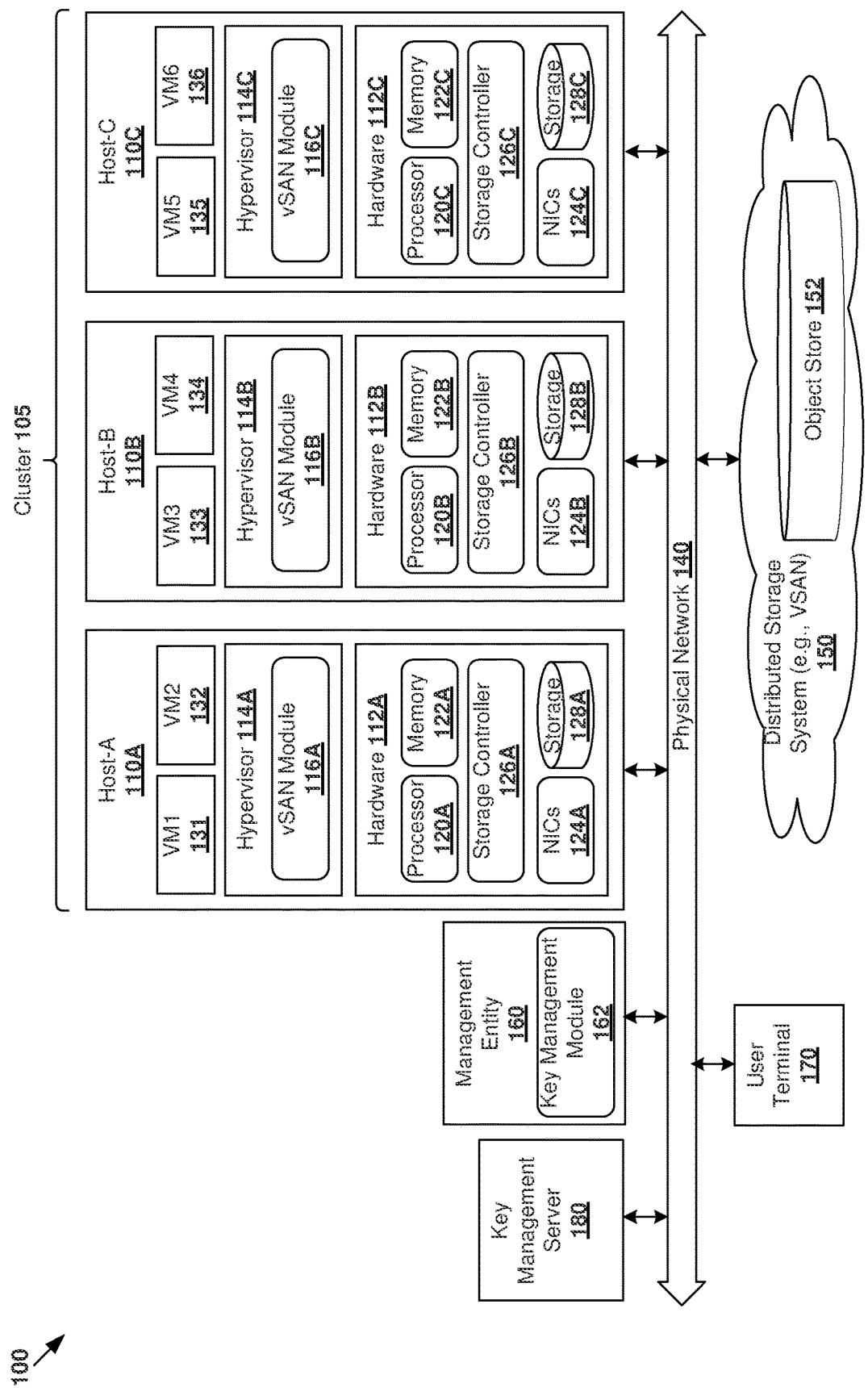
FIG. 1 is a schematic diagram illustrating an example virtualized computing environment to perform encryption and decryption operations during a rekey.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

In the disclosure, "rekey" generally refers to a process of changing one or more keys used in encryption and decryption operations. The term "rekey" and the term "rekey process" are also used interchangeably. A "key index" generally refers to an index corresponding to a key used in encryption and decryption operations. An "active key index" generally refers to a key index that specifies a key as an active key being used in encryption and decryption operations during a rekey. A "handshake" generally refers to an automated process of information negotiations between a first host and a second host before full communications between the first host and the second host begin.

Challenges relating to perform encryption and decryption operations during a rekey will now be explained in more detail using FIG. 1, which is a schematic diagram illustrating example virtualized computing environment 100. It should be understood that, depending on the desired implementation, virtualized computing environment 100 may include additional and/or alternative components than that shown in FIG. 1.

In the example in FIG. 1, virtualized computing environment 100 includes cluster 105 of multiple hosts, such as Host-A 110A, Host-B 110B, and Host-C 110C. In the following, reference numerals with a suffix "A" relates to Host-A 110A, suffix "B" relates to Host-B 110B, and suffix "C" relates to Host-C 110C. Although three hosts (also known as "host computers", "physical servers", "server systems", "host computing systems", etc.) are shown for simplicity, cluster 105 may include any number of hosts. Although one cluster 105 is shown for simplicity, virtualized computing environment 100 may include any number of clusters.

Each host 110A/110B/110C in cluster 105 includes suitable hardware 112A/112B/112C and executes virtualization software such as hypervisor 114A/114B/114C to maintain a mapping between physical resources and virtual resources assigned to various virtual machines. For example, Host-A 110A supports VM1 131 and VM2 132; Host-B 110B supports VM3 133 and VM4 134; and Host-C 110C supports VM5 135 and VM6 136. In practice, each host 110A/110B/110C may support any number of virtual machines, with each virtual machine executing a guest operating system (OS) and applications. Hypervisor 114A/114B/114C may also be a "type 2" or hosted hypervisor that runs on top of a conventional operating system (not shown) on host 110A/110B/110C.

Although examples of the present disclosure refer to "virtual machines," it should be understood that a "virtual machine" running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

Hardware 112A/112B/112C includes any suitable components, such as processor 120A/120B/120C (e.g., central processing unit (CPU)); memory 122A/122B/122C (e.g., random access memory); network interface controllers (NICs) 124A/124B/124C to provide network connection; storage controller 126A/126B/126C that provides access to storage resources 128A/128B/128C, etc. Corresponding to hardware 112A/112B/112C, virtual resources assigned to each virtual machine may include virtual CPU, virtual memory, virtual machine disk(s), virtual NIC(s), etc.

Storage controller 126A/126B/126C may be any suitable controller, such as redundant array of independent disks (RAID) controller, etc. Storage resource 128A/128B/128C may represent one or more disk groups. In practice, each disk group represents a management construct that combines one or more physical disks, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, Integrated Drive Electronics (IDE) disks, Universal Serial Bus (USB) storage, etc.

Through storage virtualization, hosts 110A-110C in cluster 105 aggregate their storage resources 128A-128C to form distributed storage system 150, which represents a shared pool of storage resources. For example, in FIG. 1, Host-A 110A, Host-B 110B and Host-C 110C aggregate respective local physical storage resources 128A, 128B and 128C into object store 152 (also known as a datastore or a collection of datastores). In this case, data (e.g., virtual machine data) stored on object store 152 may be placed on, and accessed from, one or more of storage resources 128A-128C. In practice, distributed storage system 150 may employ any suitable technology, such as Virtual Storage Area Network (vSAN) from VMware, Inc. Cluster 105 may be referred to as a vSAN cluster.

In virtualized computing environment 100, management entity 160 provides management functionalities to various managed objects, such as cluster 105, hosts 110A-110C, virtual machines 131-136, etc. In some embodiments, management entity 160 includes key management module 162 which includes credentials to log in to key management server 180. On the other hand, none of hosts 110A-110C includes such credentials to log in to key management server 180.

In some embodiments, key management server 180 is configured to generate and store an encryption key (e.g., data encryption key, DEK) and a key identifier (ID) of the encryption key for a host. More specifically, key management server 180 is configured to provide a lifecycle management of the encryption key.

In some embodiments, a host (e.g., hosts 110A-110C) in cluster 105 may obtain its specific DEK and the key ID of the DEK from key management server 180. The host is also configured to obtain its specific data encryption key (DEK) to encrypt and decrypt data in input/output (I/O) path and use another obtained key encryption key (KEK) to encrypt the DEK. The host does not locally store the KEK but only locally stores the encrypted DEK and the key ID of the DEK. The encrypted DEK and the key ID of the DEK may be included in a descriptor file of an object in distributed storage system 150.

In some embodiments, during a rekey, key management module 162 is configured to receive a rekey configuration from user terminal 170. In response to receiving a rekey configuration from user terminal 170, key management module 162 is configured to notify key management server 180 to generate a new encryption key (e.g., a new DEK) in order to replace the existing encryption key (e.g., the existing DEK) for each host. Key management server 180 is also configured to publish a key change notification in cluster monitoring membership and directory service (CMMDS) that the active key and the key ID have been changed from the existing encryption key and its corresponding existing key ID to the new encryption key and its corresponding new key ID.

In some embodiments, a host (e.g., host-B 110B) in cluster 105 processing a request to access an encrypted object in distributed storage system 150 may be referred to as an "owner" of the encrypted object. On the other hand, when a virtual machine in a host (e.g., host-A 110A) in cluster 105 issues the request to access the encrypted object, the host may be referred to as a "client" of the encrypted object. In the rekey process, new KEK and new DEKs are regenerated and all objects need to be rewritten in distributed storage system 150 with new DEKs, which is a time-consuming process. However, objects in distributed storage system 150 continuously to be read or written in the time-consuming process. Therefore, the existing DEKs and the new DEKs are being used for some time in the rekey. A rekey have to be completed first before the next rekey can be started.

Conventionally, both the owner and the client may store the existing DEK, a first key index corresponding to the existing DEK, the new DEK, a second key index corresponding to the new DEK and an active key index. The first key index and the second key index may be 0 or 1, respectively, or vice versa. The active key index may be 0 or 1 and specify whether the existing DEK corresponding to the first key index of 0 or the new DEK corresponding to the second key index of 1 to be an active key to read or write objects in distributed storage system 150 in the rekey. In virtualized computing environment 100, different hosts may receive the key change notification at different points in time. For example, the client may receive the key change notification before the owner. This may result in the client's active key index referring to the new DEK as the active key while the owner's active key index referring to the existing DEK as the active key. Therefore, one entity (e.g., owner) may use the existing DEK for encryption but the other entity (e.g., client) may use the new DEK for decryption, which will cause the decryption operation to fail.

For example, suppose at a first time point that the client and the owner store a first DEK A and a first key index of 0 (i.e., Key A, 0), a second DEK B and a second key index of 1 (i.e., Key B, 1) and the active key index of 1 (i.e., Active Key Index, 1) in Table 1.

TABLE 1

| | |
|---|---|
| Client | (Key A, 0), (Key B, 1), (Active Key Index, 1) |
| Owner | (Key A, 0), (Key B, 1), (Active Key Index, 1) |

(Active Key Index, 1) may refer to that the DEK corresponding to the key index of 1 (i.e., second DEK B) to be the active KEK in encryption and decryption operations at the first time point.

In response to a rekey process in which the client receives the key change notification before the owner and obtains a new regenerated DEK C, the client is configured to store the new DEK C and a first key index of 0 (i.e., Key C, 0), the second DEK B and the second key index of 1 (i.e., Key B, 1) and switch the active key index from 1 to 0 (i.e., Active Key Index, 0) in Table 2. The owner still stores the first KEK A and the first key index of 0 (i.e., Key A, 0), the second KEK B and the second key index of 1 (i.e., Key B, 1) and the active key index of 1 (i.e., Active Key Index, 1) in Table 2.

TABLE 2

| | |
|---|---|
| Client | (Key C, 0), (Key B, 1), (Active Key Index, 0) |
| Owner | (Key A, 0), (Key B, 1), (Active Key Index, 1) |

For the client, (Active Key Index, 0) may refer to that the DEK corresponding to the key index of 0 (i.e., new DEK C) is the active DEK in encryption and decryption operations at the second time point. The client is configured to notify the owner that the client is using the key with key index of 0 to be the active key (i.e., new DEK C). However, for the owner, the key with key index of 0 is DEK A which cannot decrypt data encrypted by new DEK C. Accordingly, decryption failure will occur.

Figure 2:
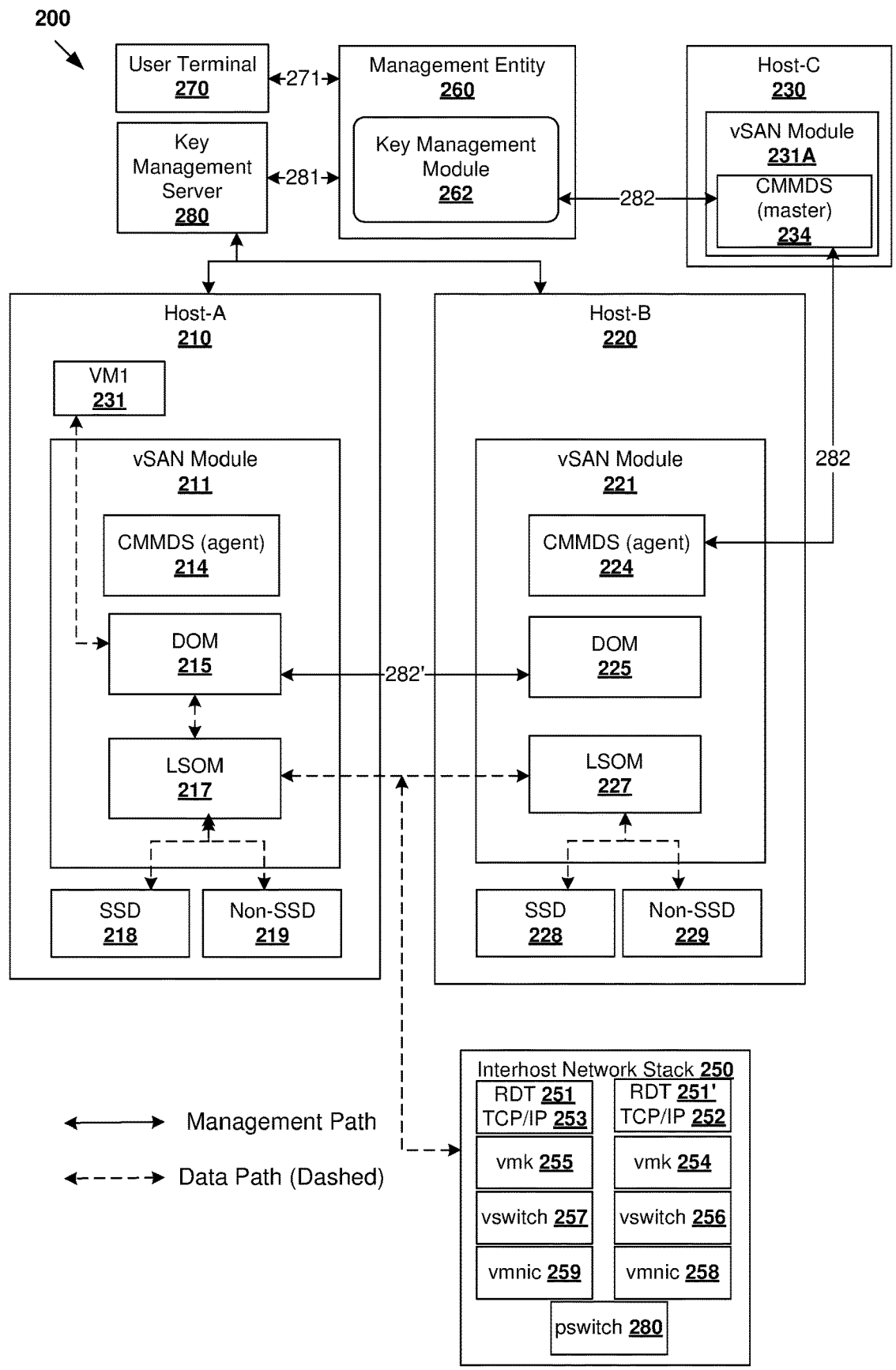
FIG. 2 is a schematic diagram illustrating an example system to perform encryption and decryption operations during a rekey in a virtualized computing environment.

FIG. 2 is a schematic diagram illustrating an example system 200 to perform encryption and decryption operations during a rekey in a virtualized computing environment. In some embodiments, system 200 include management entity 260, user terminal 270, key management server 280, host-A 210, host-B 220 and host-C 230. In some embodiments, in conjunction with FIG. 1, management entity 260 corresponds to management entity 160, host-A 210, host-B 220 and host-C 230 correspond to host-A 110A, host-B 110B and host-C 110C, respectively. In some embodiments, host-A 210, host-B 220 and host-C 230 form a vSAN cluster and host-A 210, host-B 220 and host-C 230 are configured to be nodes of the vSAN cluster.

In conjunction with FIG. 1, user terminal 270 and key management server 280 may correspond to user terminal 170 and key management server 180, respectively. Host-A 210 may include SSD 218 and non-SSD 219 which may correspond to storage 128A. Host-B 220 may include SSD 228 and 229 which may correspond to storage 128B.

In some embodiments, management entity 260 may include key management module 262. Key management module 262 is configured to receive a rekey configuration 271 from user terminal 270 and request key management server 280 (e.g., request 281) to generate a new encryption key (e.g., DEK) and a key ID of the new encryption key for host-A 210, host-B 220 and host-C 230, respectively. Key management module 262 is also configured to publish a key change notification 282 in CMMDS 234 of a master node (e.g., host-C 230) of the vSAN cluster.

In some embodiments, vSAN module 211 of host-A 210 includes CMMDS agent 214, DOM 215 and log-structured object manager (LSOM) 217. Similarly, vSAN module 221 of host-B 220 includes CMMDS agent 224, DOM 225 and LSOM 227.

In some embodiments, DOM 225 is configured to create components and distribute them across the vSAN cluster. After an object is created from a set of components across the cluster, one node (i.e., host-B 220) in the vSAN cluster is nominated as the owner for that object. The owner handles all input/output operations per second (IOPS) to that DOM object by locating the set of components across the vSAN cluster and redirecting the I/O to respective components. Another host (e.g., host-A 210) in the vSAN cluster where a virtual machine (e.g., VM 231) issuing a request to access the object may refer to as a client for that object.

In some embodiments, DOM 225 is configured to create components for a DOM object and distribute some components to LSOM 227. LSOM 227 is configured to locally store data on SSD 228 or non-SSD 229 of host-B 220 as one or more LSOM objects, which may correspond to components of the DOM object.

In some embodiments, DOM 225 is also configured to coordinate counterpart DOMs (e.g., DOM 215) of other nodes in the vSAN cluster to distribute other components to LSOM 217. LSOM 217 is configured to locally store data on SSD 218 or non-SSD 219 of host-A 210 as one or more LSOM objects, which may correspond to components of the DOM object.

In some embodiments, DOM 225 is configured to redirect the I/O to the DOM object to SSD 228 or non-SSD 229 locally or coordinate counterpart DOMs (e.g., DOM 215) to redirect the I/O to SSD 218 or non-SSD 219 remotely through interhost network stack 250. In some embodiments, interhost network stack 250 includes, but not limited to, Reliable Datagram Transport (RDT) 251, Transmission Control Protocol/Internet Protocol (TCP/IP) 253, VMKernel NIC (vmk) 255, virtual switch (vswitch) 257, VMNetwork Interface Controller (vmnic) 259 associated with host-A 210A and RDT 251', TCP/IP 252, vmk 254, vswitch 256, vmnic 258 associated with host-B 210B, and physical switch (pswitch) 280 interfaced between vmnic 258 and vmnic 259.

In some embodiments, CMMDS agent 224 on host-B 220 is also configured to subscribe a key change notification 282 from CMMDS 234 of the master node of the vSAN cluster. In response to obtaining key change notification 282, host-B 220 is configured to obtain a new encryption key and key ID of the new encryption key from key management server 280 and update an active key index indicating that the active key used by host-B 220 is changed from the existing encryption key to the new encryption key.

In some embodiments, host-B 220 (i.e., owner) is configured to transmit a first key ID of the existing encryption key, a second key ID of the new encryption key and an active key index which specifies an encryption key corresponding to the second key ID (i.e., the new encryption key) is the active key to host-A 210 (i.e., client) in a handshake between the owner and the client. The first key ID, the second key ID and the active key index collectively may be referred to as information 282'. In some embodiments, information 282' may include:

(second key ID, 0), (first key ID, 1), (Active Key Index, 0) in which (second key ID, 0) may refer to the second key ID corresponding to the new encryption key and a key index of 0, (first key ID, 1) may refer to the first key ID corresponding to the existing encryption key and a key index of 1 and (Active Key Index, 0) may refer to that a key associated with the second key ID corresponding to the key index of 0 (i.e., the new encryption key) is the active key to perform encryption and decryption operations during the rekey.

It is important to note that host-A 210 is configured not to subscribe the key change notification 282 from CMMDS 234. In some embodiments, in response to receiving information 282' from host-B 220, host-A 210 is configured to obtain the existing encryption key corresponding to the first key ID and the new encryption key corresponding to the second key ID from key management server 280. Therefore, based on the received information 282', host-A 210 is configured to obtain the existing encryption key and the new encryption key, and identify that the new encryption key is the active key for performing encryption and decryption operations. Accordingly, host-A 210 (i.e., the client) can avoid decryption failures in conventional approaches discussed above.

In some embodiments, in response to receiving another key change notification from CMMDS 234 that the active key has been changed to another new encryption key, host-B 220 is configured to terminate the connection with host-A 210. Host-A 210 is configured to reconnect to host-B 220 and initiate another handshake with host-A 210 to repeat the operations set forth above. Therefore, host-A 210 is configured to maintain same encryption keys possessed by host-B 220. In addition, host-A 210 is configured to identify the active key from the encryption keys used by host-B 220. Accordingly, host-A 210, the client, will not suffer from decryption failures in conventional approaches discussed above.

Figure 3:
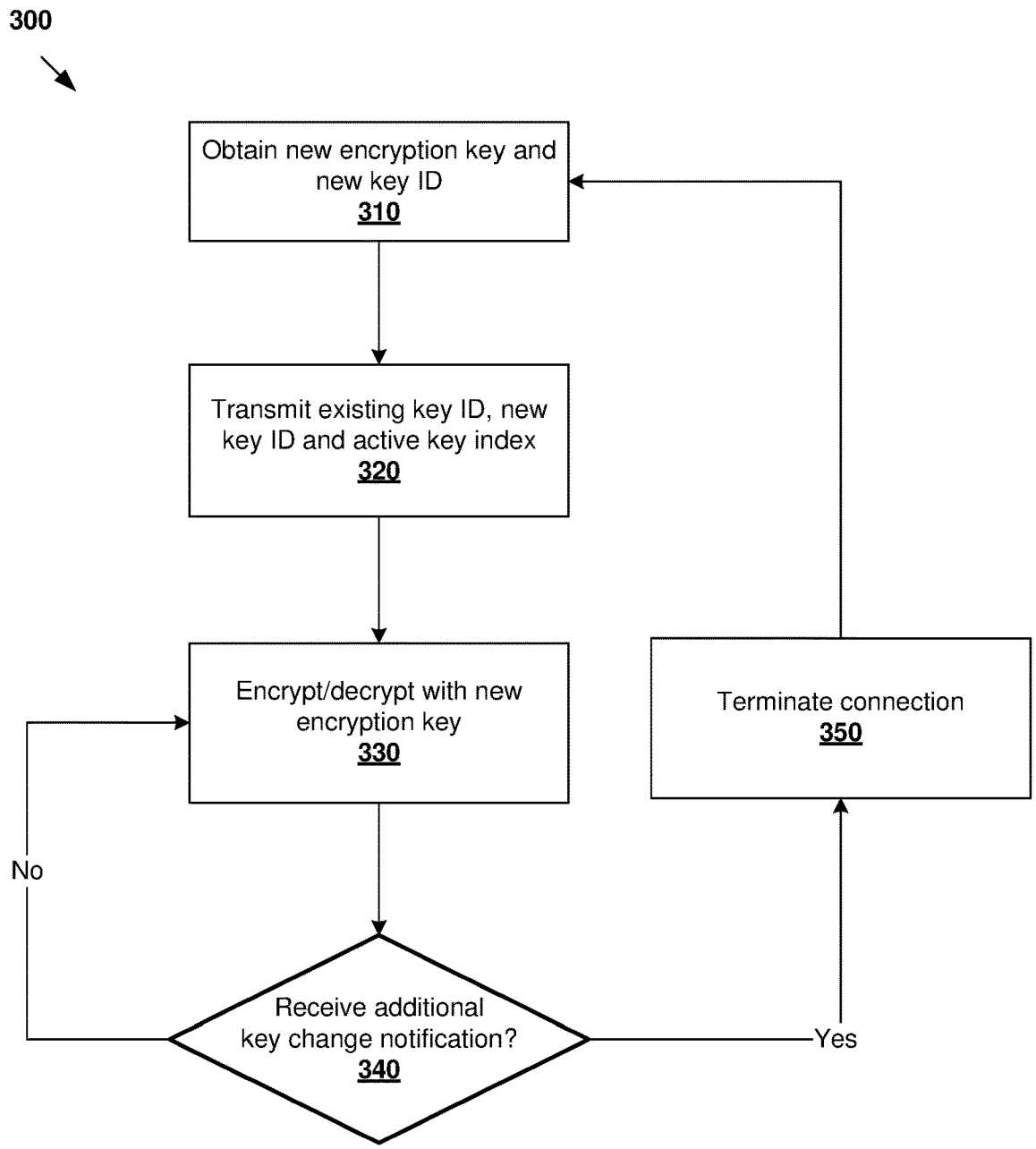
FIG. 3 is a flowchart of an example process for a first host to perform encryption and decryption operations during a rekey in a virtualized computing environment.

In more detail, in conjunction with FIG. 2, FIG. 3 is a flowchart of example process 300 for host-B 220 to perform encryption and decryption operations during a rekey in a virtualized computing environment. Example process 300 may include one or more operations, functions, or actions illustrated by one or more blocks, such as blocks 310 to 350. The various blocks may be combined into fewer blocks, divided into additional blocks, and/or eliminated depending on the desired implementation.

In some embodiments, at block 310 in FIG. 3, in conjunction with FIG. 2, host-B 220 (i.e., owner) is configured to implement CMMDS agent 224 to obtain key change notification 282 from CMMDS 234. In response to receiving key change notification 282, host-B 220 is configured to obtain a first new encryption key (e.g., DEK) and a key ID of the first new encryption key from key management server 280. Block 310 may be followed by block 320.

In some embodiments, at block 320 in FIG. 3, in conjunction with FIG. 2, in some embodiments, host-B 220 is configured to transmit a key ID (e.g., first key ID) of an existing encryption key and the key ID (e.g., second key ID) of the first new encryption key to host-A 210 (i.e., client) in a handshake between the owner and the client. Host-B 220 is also configured to transmit an active key index which specifies an encryption key corresponding to the second key ID (i.e., first new encryption key) to be the active key for performing encryption and decryption operations to host-A 210 (i.e., client) in a handshake between the owner and the client. In some embodiments, in conjunction with FIG. 2, the first key ID, the second key ID and the active key index transmitted at block 320 may correspond information 282': (second key ID, 0), (first key ID, 1), (Active Key Index, 0). Block 320 may be followed by block 330.

In some embodiments, at block 330, in conjunction with FIG. 2, host-B 220 is configured to use the first new encryption key to perform encryption and/or decryption operations. In some embodiments, the first new encryption key is a DEK. Block 330 may be followed by block 340.

In some embodiments, at block 340, in conjunction with FIG. 2, host-B 220 is configured to implement CMMDS agent 224 to subscribe an additional key change notification from CMMDS 234. The key change notification may indicate that the active key is changed from the first new encryption key to a second new encryption key. In response to not receiving the additional key change notification, block 340 may be looped back to block 330. In response to receiving the additional key change notification, block 340 may be followed by block 350.

In some embodiments, at block 350, in conjunction with FIG. 2, host-B 220 is configured to terminate the connection between the owner (i.e., host-B 220) and the client (i.e., host-A 210). Block 350 may be looped back to block 310 in which host-B 220 is configured to obtain the second new encryption key and a key ID of the second new encryption key from key management server 280 in response to receiving the additional key change notification.

Figure 4:
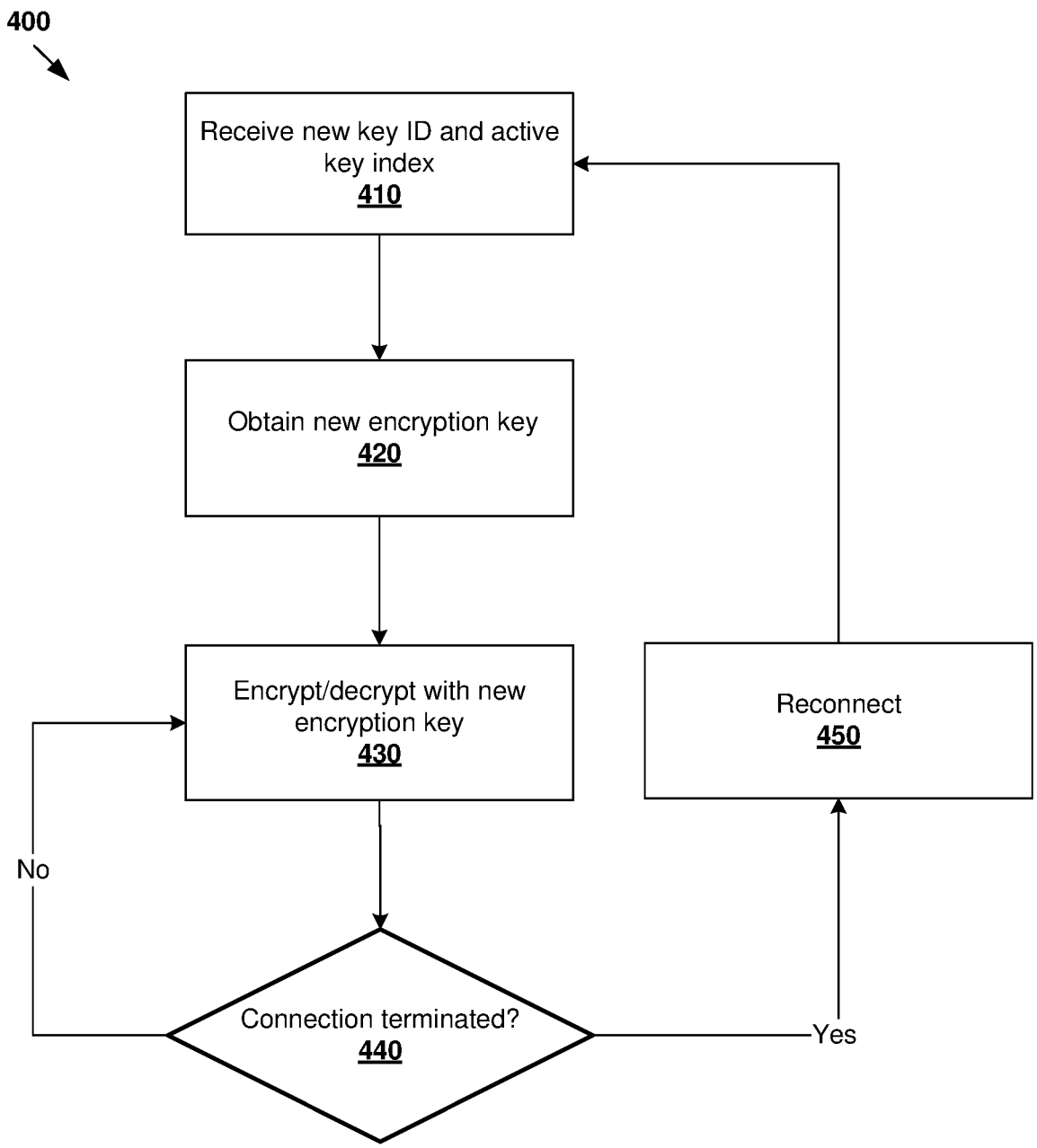
FIG. 4 is a flowchart of an example process for a second host to perform encryption and decryption operations during a rekey in a virtualized computing environment.

In more detail, in conjunction with FIG. 2, FIG. 4 is a flowchart of example process 400 for host-A 210 to perform encryption and decryption operations during a rekey in a virtualized computing environment. Example process 400 may include one or more operations, functions, or actions illustrated by one or more blocks, such as blocks 410 to 450. The various blocks may be combined into fewer blocks, divided into additional blocks, and/or eliminated depending on the desired implementation.

In some embodiments, at block 410 in FIG. 4, in conjunction with FIG. 2, host-A 210 (i.e., client) is configured to receive a key ID (e.g., first key ID) of an existing encryption key and a key ID (e.g., second key ID) of a first new encryption key in a handshake between an owner (e.g., host-B 220) and the client. Host-A 210 is also configured to receive an active key index which indicates that an encryption key corresponding to the second key ID (i.e., first new encryption key) is the active key to perform encryption and decryption operations in the handshake between the owner and the client. In some embodiments, in conjunction with FIG. 3, the key IDs and the active key index received by host-A 210 at block 410 are the key IDs and the active key index transmitted from host-B 220 to host-A 210 at block 320. Block 410 may be followed by block 420.

In some embodiments, at block 420 in FIG. 4, host-A 210 is configured to obtain the existing encryption key based on the first key ID and the first new encryption key based on the second key ID. In conjunction with FIG. 2, host-A 210 is configured to obtain the existing encryption key and the first new encryption key from key management server 280. Block 420 may be followed by block 430.

In some embodiments, at block 430 in FIG. 4, host-A 210 is configured to use the first new encryption key in encryption and/or decryption operations. In some embodiments, the first new encryption key is a DEK. Block 430 may be followed by block 440.

In some embodiments, at block 440 in FIG. 4, host-A 210 is configured to determine whether the connection between the host-A 210 and host-B 220 is terminated. In response to determining that the connection is not terminated, block 440 may be looped back to block 430.

In some embodiments, in response to determining that the connection is terminated, block 440 may be followed by block 450. In some embodiments, in conjunction with FIG.

3, the termination of the connection at block 440 may correspond to "terminate connection" at block 350. As set forth above, after the connection is terminated, host-B 220 is configured to obtain a second new encryption key and a key ID of the second new encryption key from key management server 280 in response to receiving an additional key change notification.

In some embodiments, at block 450 in FIG. 4, host-A 210 is configured to reconnect with host-B 220 to initiate a new handshake between host-A 210 and host-B 220. Block 450 may be followed by block 410 in which host-A 210 is configured to receive the key ID of the second new encryption key in the new handshake between host-B 220 and host-A 210. In the new handshake, host-A 210 is also configured to receive an active key index, which indicates that the second new encryption key is the active key to perform encryption and decryption operations.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non-recordable media (e.g., read-only memory (ROM), random access memory (RAM), magnetic disk or optical storage media, flash memory devices, solid-state drives, etc.).

It will be understood that although the terms "first," "second," third" and so forth are used herein to describe various elements, these elements should not be limited by these terms. These terms are only used to distinguish one element from another. For example, within the scope of the present disclosure, a first element may be referred to as a second element, and similarly a second element may be referred to as a first element. As used herein, the term "and/or" includes any and all combinations of one or more of the associated listed items.

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host, being an owner of an object stored in a virtual storage area network (vSAN) cluster, to perform encryption and decryption operations during a rekey in the vSAN cluster, wherein the method comprises:
   obtaining, by the first host, a first encryption key and a first key identifier (ID) of the first encryption key;
   transmitting, by the first host, the first key ID and an active key index to a second host in the vSAN cluster, wherein the second host is a client of the object and does not obtain any key change notification from a master node of the vSAN cluster and the active key index specifies that the first encryption key corresponding to the first key ID is an active key that the first host performs the encryption and decryption operations during the rekey;
   using, by the first host, the first encryption key to perform the encryption and decryption operations; and
   in response to a determination of receiving a key change notification from the master node, terminating, by the first host, a connection with the second host.

2. The method of claim 1, further comprising, in response to a determination of not receiving the key change notification from the master node, maintaining, by the first host, the first encryption key for the first host to perform the encryption and decryption operations.

3. The method of claim 1, wherein transmitting the first key ID and the active key index is performed during a handshake between the first host and the second host.

4. The method of claim 1, further comprising obtaining, by the first host, a second encryption key generated during the rekey and a second key ID of the second encryption key after terminating the connection with the second host.

5. A method for a second host, being a client of an object stored in a virtual storage area network (vSAN) cluster, to perform encryption and decryption operations during a rekey in the vSAN cluster, wherein the method comprises:
   receiving, by the second host, a first key identifier (ID) of a first encryption key and a first active key index from a first host in the vSAN cluster, wherein the first host is an owner of the object and the first active key index specifies that the first encryption key is an active key that the first host performs the encryption and decryption operations during the rekey;
   obtaining, by the second host, the first encryption key based on the first key ID;
   using, by the second host, the first encryption key to perform the encryption and decryption operations; and
   in response to a determination of a connection with the first host being terminated, reconnecting, by the second host, to the first host with a new connection.

6. The method of claim 5, further comprising receiving, by the second host, a second key ID of a second encryption key generated during the rekey and a second active key index from the first host during a handshake between the first host and the second host.

7. The method of claim 5, further comprising, in response to a determination of a connection with the first host not being terminated, maintaining, by the second host, the first encryption key for the second host to perform the encryption and decryption operations.

8. A non-transitory computer-readable storage medium, containing a set of instructions which, in response to execution by a processor, cause the processor to perform a method for a first host being an owner of an object stored in a virtual storage area network (vSAN) cluster to perform encryption and decryption operations during a rekey in the vSAN cluster, the method comprising:
   obtaining, by the first host, a first encryption key and a first key identifier (ID) of the first encryption key;
   transmitting, by the first host, the first key ID and an active key index to a second host in the vSAN cluster, wherein the second host is a client of the object and does not obtain any key change notification from a master node of the vSAN cluster and the active key index specifies that the first encryption key corresponding to the first key ID is an active key that the first host performs the encryption and decryption operations during the rekey;
   using, by the first host, the first encryption key to perform the encryption and decryption operations; and
   in response to a determination of receiving a key change notification from the master node, terminating, by the first host, a connection with the second host.

9. The non-transitory computer-readable storage medium of claim 8, wherein the method further comprises, in response to a determination of not receiving the key change notification from the master node, maintaining, by the first host, the first encryption key for the first host to perform the encryption and decryption operations.

10. The non-transitory computer-readable storage medium of claim 8, wherein transmitting the first key ID and the active key index is performed in a handshake between the first host and the second host.

11. The non-transitory computer-readable storage medium of claim 8, wherein the method further comprises obtaining, by the first host, a second encryption key generated during the rekey and a second key ID of the second encryption key after terminating the connection with the second host.

12. A non-transitory computer-readable storage medium, containing a set of instructions which, in response to execution by a processor, cause the processor to perform a method for a second host being a client of an object stored in a virtual storage area network (vSAN) cluster to perform encryption and decryption operations during a rekey in the vSAN cluster, the method comprising:
   receiving, by the second host, a first key identifier (ID) of a first encryption key and a first active key index from a first host in the vSAN cluster, wherein the first host is an owner of the object and the first active key index specifies that the first encryption key corresponding to the first key ID is an active key that the first host performs the encryption and decryption operations;
   obtaining, by the second host, the first encryption key based on the first key ID;
   using, by the second host, the first encryption key to perform the encryption and decryption operations; and
   in response to a determination of a connection with the first host being terminated, reconnecting, by the second host, to the first host with a new connection.

13. The non-transitory computer-readable storage medium of claim 12, the method further comprising receiving, by the second host, a second key ID of a second encryption key generated during the rekey and a second active key index from the first host during a handshake between the first host and the second host.

14. The non-transitory computer-readable storage medium of claim 12, the method further comprising, in response to a determination of a connection with the first host not being terminated, maintaining, by the second host, the first encryption key for the second host to perform the encryption and decryption operations.

15. A first host, being an owner of an object stored in a virtual storage area network (vSAN) cluster, configured to perform encryptions and decryptions during a rekey in the vSAN cluster, wherein the first host includes:
   a processor; and
   a non-transitory computer-readable medium having stored thereon instructions that, in response to execution by the processor, cause the processor to:
   obtain a first encryption key and a first key identifier (ID) of the first encryption key;
   transmit the first key ID and an active key index to a second host in the vSAN cluster, wherein the second host is a client of the object and does not obtain any key change notification from a master node of the vSAN cluster and the active key index specifies that the first encryption key corresponding to the first key ID is an active key that the first host performs encryption and decryption operations during the rekey;
   use the first encryption key to perform the encryption and decryption operations; and
   in response to a determination of receiving a key change notification from the master node, terminate a connection with the second host.

16. The first host of claim 15, wherein the non-transitory computer-readable medium having stored thereon additional instructions that, in response to execution by the processor, cause the processor to, in response to a determination of not receiving the key change notification from the master node, maintaining the first encryption key for the first host to perform the encryption and decryption operations.

17. The first host of claim 15, wherein transmitting the first key ID and the active key index is performed in a handshake between the first host and the second host.

18. The first host of claim 15, wherein the non-transitory computer-readable medium having stored thereon additional instructions that, in response to execution by the processor, cause the processor to obtain a second encryption key generated during the rekey and a second key ID of the second encryption key after terminating the connection with the second host.

19. A second host, being a client of an object stored in a virtual storage area network (vSAN) cluster, configured to perform encryption and decryption operations during a rekey in the vSAN cluster, wherein the second host includes:
   a processor; and
   a non-transitory computer-readable medium having stored thereon instructions that, in response to execution by the processor, cause the processor to:
   receive a first key identifier (ID) of a first encryption key and a first active key index from a first host in the vSAN cluster, wherein the first host is an owner of the object and the first active key index specifies that the first encryption key is an active key that the first host performs the encryption and decryption operations during the rekey;

obtain the first encryption key based on the first key ID;

use the first encryption key to perform the encryption and decryption operations; and in response to a determination of a connection with the first host being terminated, reconnect to the first host with a new connection.

20. The second host of claim 19, wherein the non-transitory computer-readable medium having stored thereon additional instructions that, in response to execution by the processor, cause the processor to receive a second key ID of a second encryption key generated during the rekey and a second active key index from the first host during a handshake between the first host and the second host.

21. The second host of claim 19, wherein the non-transitory computer-readable medium having stored thereon additional instructions that, in response to execution by the processor, cause the processor to, in response to a determination of a connection with the first host not being terminated, maintain the first encryption key for the second host to perform the encryption and decryption operations.

* * * * *